Patented Feb. 10, 1953

2,628,182

UNITED STATES PATENT OFFICE 2,628,182

BENZOCAINE ANESTHETIC SOLUTION

Julian R. Reasenberg, Brooklyn, N. Y., assignor to Mizzy, Inc., New York, N. Y., a corporation of New York No Drawing. Application May 10, 1950, Serial No. 161,257

5 Claims. (Cl. 167—52)

This invention relates to topical anesthesia; and in particular is directed to non-oleaginous liquid topical anesthetics wherein benzocaine is present in markedly high concentration.

Topical anesthesia is employed by dentists where painful conditions are present near the gum line; to anesthetize the locus into which a hypodermic needle is to be inserted; to relieve pain in sore or abraded spots underneath dentures; and in other conditions where such anesthesia is indicated.

Among the desiderata of a good topical anesthetic are the following:

It should be as effective as possible in producing the desired anesthesia.

It should leave no residue.

It should be as non-toxic as possible, particularly in the locus of application.

Various materials and compounds have been proposed for use as topical anesthetics. Some have definite disadvantages. For example, phenol is caustic. Liquid topical anesthetics in which ethanol is the solvent for the anesthetic drug are frequently irritating because of the high concentration of the ethanol required to achieve an adequate concentration of the anesthetic. Topical anesthetics in which oleaginous or hydrophobic vehicles are used for the drug are unsatisfactory because of the poor penetration of such vehicles. Accordingly, hydrophilic topical anesthetics are superior and indeed are preferred.

Of the various compounds possessing anesthetic properties benzocaine stands out conspicuously as a preferred drug. It has been recognized for years as an excellent topical anesthetic from the standpoint of its efficacy in producing anesthesia and from the standpoint of safety in the use thereof. Since benzocaine is a solid, and accordingly must be applied in the form of a solution thereof, the law of mass action demands that the anesthetic drug be present in the solution in as great a concentration as possible in order to achieve deep anesthesia of the mucosa.

Propylene glycol has been recognized as an excellent vehicle for benzocaine. It is far superior to ethanol for that purpose. However, there is an inherent limitation in using propylene glycol per se as the vehicle for benzocaine because, at room temperature, the maximum solubility of benzocaine therein is 10%, and at lower temperatures the solubility is reduced to 8%.

For years the workers in this art have sought to discover some means whereby the advantageous characteristics of propylene glycol as the solvent vehicle for benzocaine could be utilized if only it were possible substantially to increase its power to dissolve benzocaine. I have discovered that it is possible to accomplish this long sought for objective.

Accordingly it is among the principal objects of this invention to provide a bland hydrophilic liquid composition containing a markedly increased amount of benzocaine.

A further object of this invention is to provide a hydrophilic liquid composition for use as a topical anesthetic employing propylene glycol as the vehicle for a markedly increased amount of benzocaine held in solution.

In its principal aspects this invention arises from my discovery that the solubility of the benzocaine in propylene glycol is greatly enhanced by the action of the compounds derived from the interaction of a hexitan with lauric acid and an alkylene oxide, said alkylene oxide being either ethylene oxide or propylene oxide.

The order of interaction of the reacting materials determines the molecular structure of the final product. Thus, if a hexitan is allowed to react with lauric acid, under suitable conditions, the hexitan monolaurate will be formed. This ester may then be made to react with an alkylene oxide such as ethylene oxide or propylene oxide to form a polyalkylene oxide derivative of the hexitan monolaurate. Conversely, the hexitan may be allowed first to react with an alkylene oxide to form a polyalkylene oxide derivative of the hexitan, which derivative in turn may be esterified to form the monolaurate of a polyalkyleneoxyhexitan.

These compounds, when the number of moles of alkylene oxide allowed to react per mole of hexitan employed is between eight and twenty-five, possess the unique property of increasing the solubility of the benzocaine in propylene glycol, a property which is in marked contrast to that of the corresponding polyoxyalkylene addition compounds of the hexitan esters of palmitic acid, oleic acid, stearic acid and the like, which are devoid of power to increase the solubility of benzocaine in propylene glycol.

An illustrative preparation which has been used heretofore as a topical anesthetic has the following composition:

| | Per cent |
|---|---|
| Propylene glycol | 83.8 |
| Aerosol OT (the dioctyl ester of a sulfonated succinic acid) | 1.0 |
| Benzocaine U. S. P. | 10.0 |
| Chlorbutanol U. S. P. | 5.0 |
| Flavoring and certified color | 0.2 |

The above composition, while stable at room temperature, is not stable at 0° C. At this lower temperature the benzocaine crystallizes out, its maximum concentration at this temperature being of the order of 8%. The maximum concentration at room temperature being the 10% shown above.

In marked contrast with the above described composition I have found that a mixture of a hexitan monolaurate polyoxyalkylene addition product, or the monolaurate of the polyalkylene oxide derivative of a hexitan (8–25 moles of the polyalkylene oxide) and propylene glycol, provides an ideal hydrophilic base for the preparation of my topical anesthetic.

By increasing the amount of such a polyoxyethylene hexitan monolaurate the solubility of the benzocaine is increased. Any one skilled in the art may, by using this discovery, make suitable formulations of a topical anesthetic containing benzocaine in a propylene glycol base.

The following examples show compositions which are stable at 0° C. that contain more than 10 per cent of benzocaine.

*Example 1*

As an example of the practical application thereof a hydrophilic base containing sorbitan monolaurate (polyoxyethylene) 20 and propylene glycol in the approximate ratio of 3:7 affords a base which is capable of dissolving approximately twice the amount of benzocaine that is soluble in a propylene glycol base devoid of the above described ester.

The following formulation is illustrative:

|   | Per cent |
|---|---|
| Benzocaine | 16 |
| Chlorbutanol U. S. P. | 5 |
| Sorbitan monolaurate 20 polyoxyethylene units per mole | 23.4 |
| Aerosol OT | 1.0 |
| Propylene glycol | 54.4 |
| Flavoring and certified coloring | 0.2 |

This composition is stable at 0° C. Even when it is seeded with a crystal of benzocaine there is a failure of the benzocaine to precipitate. It will be observed that this composition contains twice the maximum amount of benzocaine that was heretofore capable of being maintained in solution at 0° C. in a topical anesthetic of this class.

*Example 2*

A composition was prepared in accordance with the general formulation of Example 1, except that the mannitan monolaurate (20 polyoxyethylene units per mole) was used in place of the corresponding sorbitan derivative in Example 1.

The composition had the desirable characteristics of that of Example 1.

*Example 3*

A composition was prepared in accordance with the general formulation of Example 1 using sorbitan monolaurate (10 polyoxyethylene units per mole) in place of the corresponding 20 polyoxyethylene derivative in Example 1.

This composition had the desirable characteristics of that of Example 1.

*Example 4*

A composition was prepared in accordance with the general formulation of Example 1, except that sorbitan monolaurate (20 polypropylene oxide units per mole) replaced the polyoxyethylene derivative of sorbitan monolaurate employed in Example 1.

This composition exhibited a tendency toward precipitation of the benzocaine at lower temperatures. However, when the amount of benzocaine was lowered somewhat, i. e., to about 160% of the benzocaine in the illustrative preparation heretofore used, that composition showed excellent stability at 0° C.

*Example 5*

A composition was prepared in accordance with the general formulation of Example 1, except that sorbitan (20 polyoxyethylene units per mole) monolaurate was used in place of sorbitan monolaurate (20 polyoxyethylene) compound employed in Example 1.

This composition likewise had the desirable properties of that of Example 1.

*Example 6*

A composition was prepared in accordance with the general formulation of Example 1, except that sorbitan monolaurate (25 polyoxyethylene units per mole) was employed in place of the 20 polyoxyethylene derivative of sorbitan monolaurate used in Example 1.

This composition had the desirable properties of the composition of Example 1.

There were also prepared similar compositions in accordance with the above formulations using, as the enhancer of the solubility of the benzocaine, the 12 polyoxyethylene units per mole and the 15 polyoxyethylene units per mole derivatives of sorbitan monolaurate in place of the corresponding 20 polyoxyethylene derivative employed in Example 1. These compositions gave excellent results.

It was found that the compounds containing 4 polypropylene oxide units per mole of sorbitan monolaurate or 4 polyoxyethylene units per mole of mannitan monolaurate, corresponding to that of the compound used in Example 1, failed to enhance the solubility of the benzocaine in compositions similar to that of Example 1. Satisfactory topical anesthetics having the desired high content of benzocaine and possessing the stability characterized by those in examples described were achieved by using, as the solubility enhancer of the benzocaine, a hexitanlauric acid monoester-polyoxyalkylene compound in which there are present at least 8 polyoxyalkylene units per mole of the hexitan in the molecule.

As used in the appended claims the term "hexitan monolaurate-polyoxyalkylene derivative" means the monolaurate of the hexitan polyalkyleneoxide addition compounds and the polyalkyleneoxide addition compounds of hexitan monolaurate. Similar terminology with respect to particular alkylene oxides designates the same two types of esters.

It will be understood that the foregoing description of this invention and the embodiment thereof is merely illustrative of its principles. Accordingly the appended claims are to be construed as defining this invention within the full spirit and scope thereof.

I claim:

1. A liquid topical anesthetic solution stable at 0° C. comprising propylene glycol, more than 10 per cent of benzocaine, and a hexitan monolaurate-polyoxyalkylene derivative having from 8 to 25 alkyleneoxide units per mole.

2. A liquid topical anesthetic solution stable at 0° C. comprising propylene glycol, more than 10 per cent of benzocaine, and a sorbitan monolaurate-polyoxyalkylene derivative having from 8 to 25 alkyleneoxide units per mole.

3. A liquid topical anesthetic solution stable at 0° C. comprising propylene glycol, more than 10 per cent of benzocaine, and a mannitan laurate-polyoxyalkylene derivative having from 8 to 25 alkyleneoxide units per mole.

4. A liquid topical anesthetic solution stable at 0° C. comprising propylene glycol, more than 10 per cent of benzocaine, and polyoxyethylene sorbitan monolaurate (20 ethylene oxide units per mole).

5. A liquid topical anesthetic solution stable at 0° C. comprising:

| | Per cent (approximately) |
|---|---|
| Benzocaine | 16 |
| Chlorbutanol U. S. P. | 5 |
| Polyoxyethylene sorbitan monolaurate (20 ethylene oxide units per mole) | 23.4 |
| The dioctyl ester of a sulfonated succinic acid | 1.0 |
| Propylene glycol | 54.4 |

JULIAN R. REASENBERG.

REFERENCES CITED

The following references are of record in the file of this patent:

UNITED STATES PATENTS

| Number | Name | Date |
|---|---|---|
| 2,045,125 | Curtis | June 23, 1936 |
| 2,382,546 | Curtis | Aug. 14, 1945 |

OTHER REFERENCES

American Journal of Pharmacy, Jan. 1937, pages 19 to 23.

Atlas Spans and Atlas Tweens Surface Active Agents, Nov. 1942, pages 7, 8.

U. S. Dispensatory, 24th ed. (1947), pages 263, 264, 382.

Atlas Surface Active Agents (1948), page 51.

Bulletin of the American Society of Hospital Pharmacists, vol. 6, (1949), page 118.

Bulletin of the American Society of Hospital Pharmacists, vol. 6, (July–Aug. 1949), page 170.